Oct. 16, 1956 — M. B. THOMAS — 2,766,932
NAVIGATIONAL AID
Filed Oct. 8, 1951 — 2 Sheets-Sheet 1
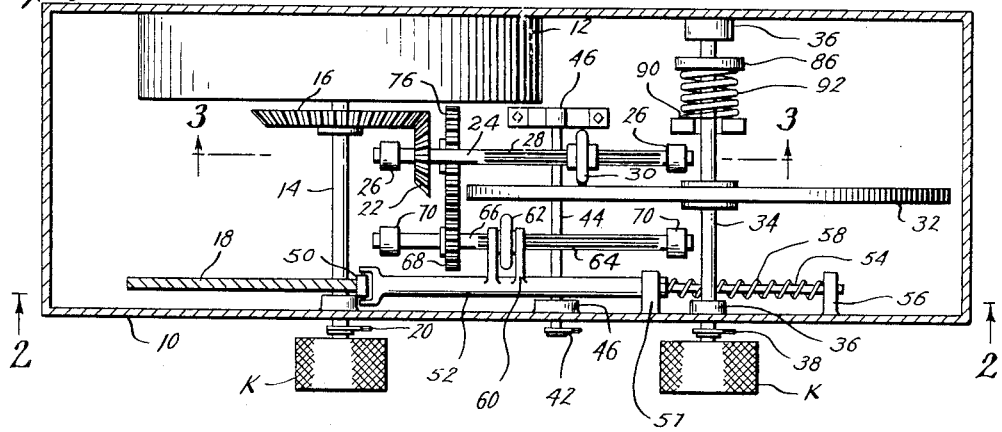
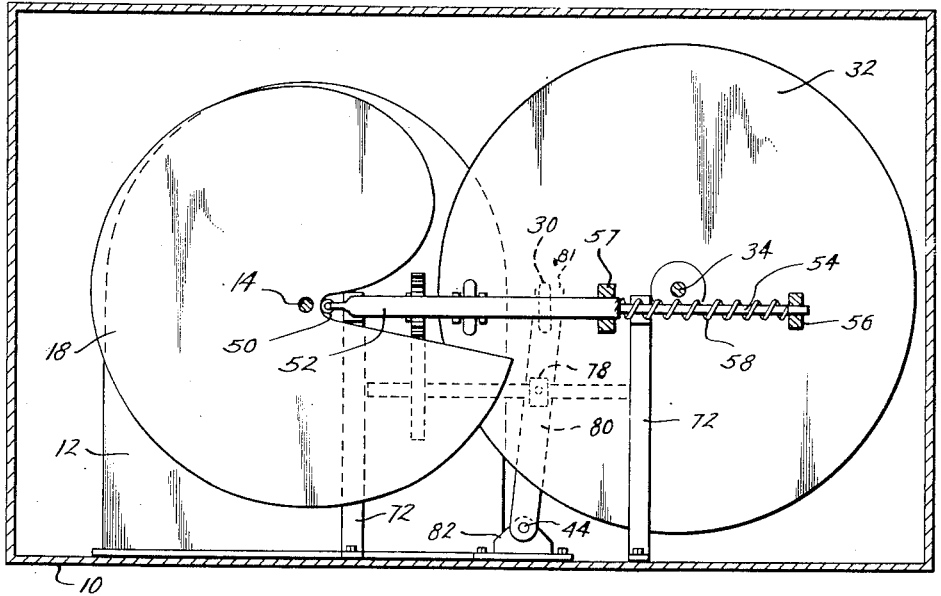
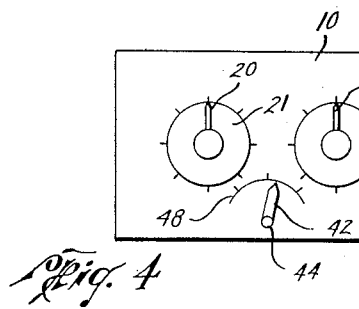
MAURICE BOWMAN THOMAS
INVENTOR.
BY James F. Weiler
ATTORNEY Oct. 16, 1956

M. B. THOMAS 2,766,932

NAVIGATIONAL AID

Filed Oct. 8, 1951

2 Sheets-Sheet 2

MAURICE BOWMAN THOMAS
INVENTOR.

BY James F. Wieler

ATTORNEY

United States Patent Office 2,766,932
Patented Oct. 16, 1956

2,766,932

NAVIGATIONAL AID

Maurice Bowman Thomas, Houston, Tex.

Application October 8, 1951, Serial No. 250,323

16 Claims. (Cl. 235—61)

This invention relates to navigation aids and, more particularly, relates to instruments useful in navigating aircraft.

In aircraft and marine navigation, there is a need for a quick and easy means of determining ground speed and for determining the position of the craft along a predetermined course at any time.

Accordingly, it is a general object of the invention to provide a means for quickly and readily determining the ground speed of the craft and for determining the position of the craft along a predetermined course at any time.

It is a particular object of the present invention to provide a navigational aid which provides a means for quickly and readily determining the position of the craft along a predetermined course and the ground speed thereof based upon known or ascertainable data, thereby providing accurate information.

It is a still more particular object of the present invention to provide such a navigational aid which is based upon a driving motor and the distance travelled between predetermined points along a particular course.

It is yet a further object of the present invention to provide such a navigational aid in which in adjusting the ground mileage at a predetermined point, the ground speed is automatically adjusted based upon the average ground speed to the predetermined point.

It is still a further object and feature of the present invention to provide such a navigational aid which is relatively simple and inexpensive to manufacture and install, which is inexpensively and easily repaired, and which provides an automatic adjustment of ground speed merely by adjusting the ground mileage along a predetermined course.

A still more particular object of the present invention is to provide an aircraft instrument which has a variable transmission, the ratio of which is proportional to ground mileage, and a synchronizer, which is a function of elapsed time, engageable with the variable transmission to adjust its ratio based upon predetermined ground mileage and to indicate ground speed and ground mileage.

Figure 3:
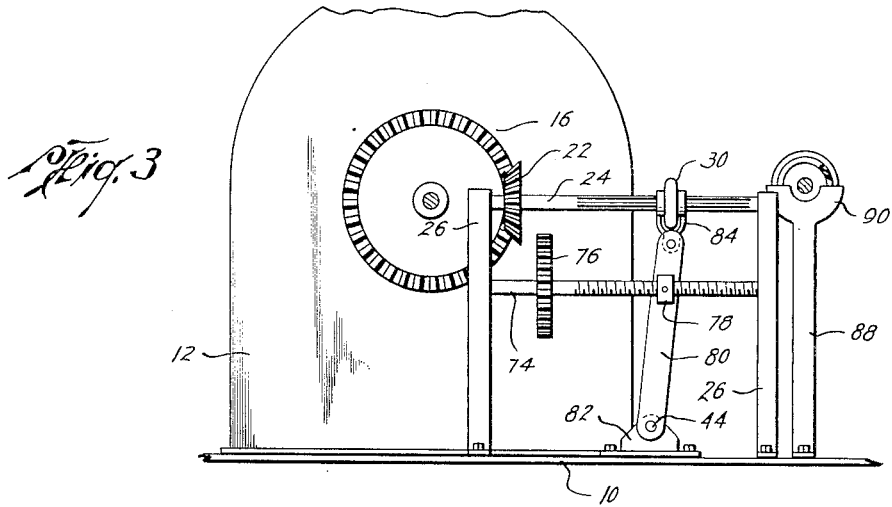
Figure 5:
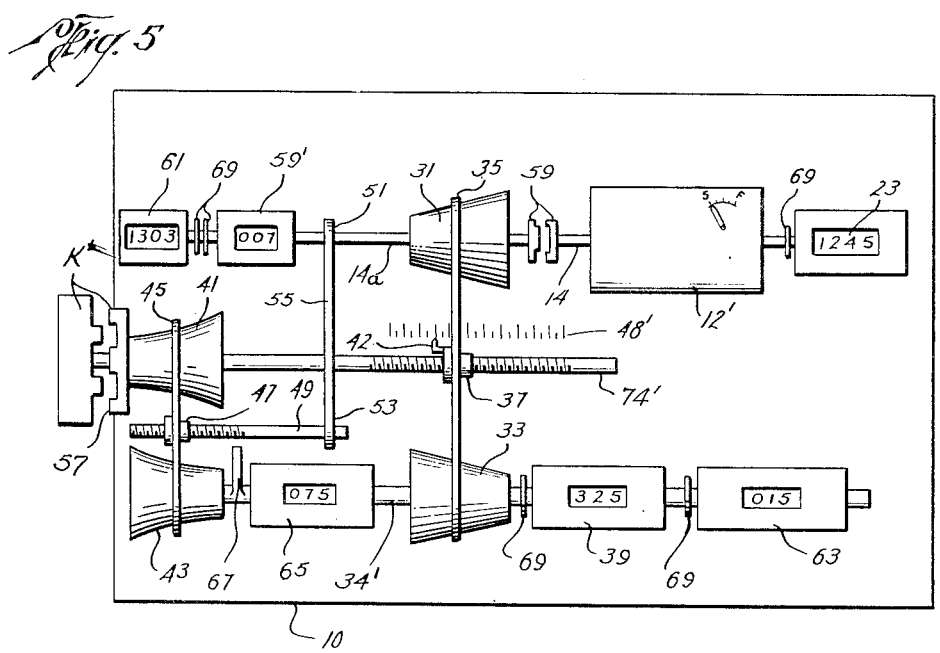

Other and further objects and features will be apparent from the following description of an example of the invention, given for the purpose of disclosure, in connection with the accompanying drawings, where like reference numerals designate like parts throughout the several views, and where Figure 1 is a plan view, partly in section, illustrating an aircraft instrument constructed in accordance with the invention, Figures 2 and 3 are taken along the lines 2—2 and 3—3, respectively, of Figure 1, Figure 4 diagrammatically illustrates an instrument panel of the instrument of Figure 1, and Figure 5 is a diagrammatic illustration of a modified example constructed in accordance with the invention.

Referring now to the drawings, and particularly to Figures 1, 2 and 3, the reference numeral 10 designates a case or housing for the navigational aid, which case may be formed of any suitable material. A driving means 12, as better seen in Figure 1, is provided to drive the various elements and the driving means is illustrated as a clock motor 12 secured to the back of the housing 10. The clock motor 12 drives the driving shaft 14 which has secured thereto the bevel gear 16, the cam 18 and a pointer 20 cooperating with a clock dial 21 disposed exteriorly of the case 10, as seen in Figure 4. As will be apparent later, the clock motor 12 drives what is termed a first variable transmission and changes the drive ratio of a second variable transmission or synchronizer for adjusting the first variable transmission.

In order for the device to indicate the number of miles travelled from a predetermined point, it is necessary to provide a first variable transmission or adjustable drive linking the clock motor to a ground mileage indicator, the ratio of which is proportional to ground speed, and this drive is provided by suitable gearing, such as the bevel gear 22 secured to the shaft 24 meshing with and being driven by the driving gear 16. The shaft 24 is journaled in the upright standards 26 and, the shaft 24 is splined at 28 and has the friction wheel 30 slideable longitudinally thereon but splined or keyed to the shaft 24. Thus, the friction wheel 30 is slideable longitudinally on the shaft 24 but is rotated by the shaft 24 which in turn is driven by means of the gears 16 and 22.

The wheel 30 is disposed at right angles to and drives and engages a friction disc 32 secured to the shaft 34 which is journaled in the bearings 36 secured to the case 10. The shaft 34 has a pointer or indicator 38 disposed exteriorly of the case 10 which indicates ground mileage on the dial 40.

Thus, it is noted that the position of wheel 30 on the shaft 24 controls the ratio between the constant driving motor 12 and the driven indicator 38. A means for adjusting the position of the wheel 30 on the shaft 24 and thereby providing the variable transmission with a ratio proportional to ground speed whereby ground mileage is indicated as hereinafter explained in detial.

In order to indicate the ground speed of the craft to which the device is secured, an indicator or pointer 42 is secured to the shaft 44 which is journaled in the bearings 46 secured to the case 10. The position of the pointer or indicator 42 is controlled by the rotation of the shaft 44 and indicates on the dial face 48 disposed at the front of the case 10 the ground speed of the craft.

In order to make a proper adjustment with respect to the ground mileage indicator 38 and automatically adjust the ground speed indicator 42 to indicate the ground speed of the craft based upon a previous average ground speed, it is necessary to provide a second variable transmission or drive, the ratio of which is inversely proportional to an increment of time or time elapsed from a predetermined point. A suitable variable transmission or synchronizer is illustrated in Figure 1 which includes the cam 18 and the follower element 50 journaled to the follower arm 52 which is slideable over the shaft 54. The shaft 54 may be secured to the case 10 by any suitable means, such as the brackets 56 and 57, through which the follower arm 52 may move axially while restrained from lateral movement. A spring 58 is disposed about the shaft 54 and abuts the bracket 56 and an end of the follower arm 52. Thus, as the cam 18 is rotated by the clock motor 12 the follower arm 52 will move or slide along the shaft 54. The shape of the cam 18 is such that the follower arm 52 will be moved a predetermined distance during each increment of time so as to provide a certain predetermined ratio in the variable transmission for each increment of time since the cam 18 was set at its "zero" position. An example of how the ratio of the second variable transmission must be varied with time is that for each one mile correction on the ground mileage indicator 38, the ground speed indicator 42 must be changed one M. P. H. if the time since the "zero" position of the cam 18 or clock 12 is sixty minutes, two M. P. H., if thirty minutes, four M. P. H., if fifteen minutes, and twelve M. P. H., if five minutes.

Included in the second variable transmission and secured to the follower arm 52 is an element 60 having the friction wheel 62 disposed between its arms. The friction wheel 62 is splined or keyed at 64 to the driven shaft 66 which has the driven gear 68 secured thereto. The driven shaft 66 is secured in the bearings 70 of the standards 72 extending from the bottom of the case 10. Thus, it will be seen that the movement of the follower arm 52 will in turn move the wheel 62 along the splined driven shaft 66, and rotation of the wheel 62 will rotate the driven shaft 66 and the gear 68 secured thereto.

The gear 68 meshes with and drives the gear 76 secured to the threaded driven shaft 74, as best seen in Figure 3.

With further reference to Figure 3, the threaded driven shaft 74 is rotatably secured to the upright standards 26, which also support the shaft 24 in suitable bearings disposed at their upper ends. A nut 78 is threaded on the threaded driven shaft 74, the nut 78 being secured to a pivoted link arm 80 which is pivotally secured by the shaft 44 to the bracket 82.

The upper end of the link arm 80 is swively secured to the substantially U-shaped member 84 having the wheel 30 journaled therebetween. Thus, rotation of the threaded driven shaft 74 moves the nut and thereby rotates the shaft 44 having the ground speed indicator 42 secured thereto. Additionally the movement of the nut 78 varies the position of the wheel 30 keyed on the shaft 24 which provides a link in the first variable transmission, the ratio of which is proportional to ground speed. If desired and for great accuracy, element 78, wheel 30 and indicator 42 may be connected to a common carriage in place of the aforementioned pivoted arrangement so that element 78 and wheel 30 will move axially along their shafts exactly the same distance or in the exact ratio with each movement of element 78.

In the form shown, the adjustment of ground mileage and the automatic adjustment of ground speed of the craft is made by rotating the shaft 34 with the friction wheel 32 in engagement with the friction wheel 62. In order that the friction wheel 32 is engageable with the friction wheel 62, the shaft 34 is slideable in the bearings 36 and has a circumferential flange 86 disposed thereon. A standard 88, see Figure 3, extends upwardly from the bottom of the case 10 and its upper end is bifurcated at 90 to provide a stop member for the compression spring 92 disposed about the shaft 34 and between the flange 86 and stop elements 90. Thus, the shaft 34 is normally in position to maintain the friction wheel 32 in frictional engagement with the friction wheel 30, but in making an adjustment the shaft 34 is moved toward the front of the case until the friction wheel 32 on the driven shaft 34 engages the friction wheel 62 splined to the driving shaft 66, the friction wheel thereby forming a link in the second variable transmission. Thus, when the mileage on indicator 38 is corrected to actual mileage travelled, it will be seen that rotation of the shaft 34, when the friction wheels 32 and 62 are in frictional engagement, will rotate the driving gear 68 which will in turn drive driven gear 76 thereby rotating the threaded shaft 74 and moving the nut 78 along the shaft, which in turn, by means of the pivoted arm 80 moves the driving friction wheel 30 to a position which provides the first variable transmission with a ratio proportional to ground speed for the mileage just travelled since cam 18 was set at "zero" position. It will be seen that the position of the friction wheel 62 on the shaft 66, which is controlled by the follower arm 52 adjusts for the time elapsed from "zero" position of the second variable transmission in automatically adjusting the ground speed and thereby the position of the wheel 30 in the first variable transmission.

The position of the follower arm 52 is controlled, as stated heretofore, by the cam 18 which is so formed to function as an increment of time or time elapsed between predetermined points.

In order to aid in the adjusting of the device the knurled knobs K are secured to the shafts 34 and 14. The clock indicator 20 may be adjusted on the clock dial 21 by means of rotating the knob K on the shaft 14, and inasmuch as the means for adjusting the clock are conventional, no detailed description is deemed necessary.

As an example of use of the ground speed and ground mileage indicator as an aid to navigation, assume that a predetermined course is to be followed having a series of predetermined check points along the course, the exact mileage of the check points from the point of departure and from one another being known or ascertainable. At the point of departure, the knobs K are manipulated to bring the clock pointer 20 to zero position on the clock dial 21, the ground mileage pointer 38 to zero position on the dial 40, and the ground speed is estimated and set on the pointer 42. The follower 50, follower arm 52 and cam 18 are in "zero" position, as illustrated in Figures 1 and 2. The setting of the estimated ground speed will move the wheel 30 along the splined shaft 24 and provide an estimated ground speed ratio in the first variable transmission. The ground mileage is indicated by the pointer 38 on the dial 40, the ground mileage indicator being driven by the clock motor 12 by means of the first variable transmission, the ratio of which is proportional to the estimated ground speed set by the pointer 42, as previously mentioned.

When the first check point is reached, in all probability an adjustment will be necessary, and the known ground mileage from the point of departure is set on the mileage dial 40 by adjusting the pointer 38. This is accomplished by pulling out on the knob K secured to the shaft 34 which disengages the friction disc 32 from the wheel or roller 30 and engages the friction disc 32 with the friction wheel 62. Inasmuch as the position of the friction wheel 62 is controlled by the position of the cam 18 and follower arm 52, the adjustment will be transmitted through the shaft 66, gears 68, 76, shaft 74, threaded nut 78, and shaft 44 to the ground speed pointer 42 and will determine the position of the wheel 30 of the variable transmission actuating the mileage indicator 38. As soon as the hand knob K is released, the friction disc 32 returns to engagement with the wheel or roller 30 because of the action of the spring 92. If desired, the clock 20 may be set to zero again by manipulation of the knob K connected to the shaft 14, which will position the wheel 62, cam 18 and follower arm 52 as shown in Figures 1 and 2. This last mentioned adjustment, of course, is made with the friction wheels 32 and 62 disengaged. If desired, however, no adjustment is necessary in connection with the clock indicator 20 and remaining adjustments may be made as indicated inasmuch as the elapsed time is accounted for by the cam 18.

Thus, the estimated ground mileage is corrected to show the correct ground mileage between the point of departure and the first check point and the average ground speed is used as the basis for ground mileage from the first check point to destination or the next check point. Depending on whether or not the clock has been zeroed, at the next check point, the total mileage since departure is corrected on the mileage indicator 38 which in turn provides the necessary adjustment for the ground speed indicator, based either on the average ground speed between check points one and two or between the point of departure and check point two. The instrument may be adjusted at preedtermined points as often as desired.

A modification is illustrated in Figure 5, and with reference to Figure 5, the clock motor 12' drives the clock counter 23 by the driving shaft 14'. The first variable transmission in this modification is provided by the driving cone pulley 31 secured to the shaft 14a and the oppositely disposed and driven cone pulley 33 secured to the driven shaft 34', the belt 35 engaging the cone pulleys and the yoke 37 secured to the threaded shaft 74'. A suitable pointer 42' cooperating with the ground speed scale 48' is connected to the yoke 37. Thus, the position of the belt 35 upon the opposed cone pulleys 31 and 33 will be indicated upon the ground speed indicator to provide a ratio of ground speed between the constant driving shaft 14a and the driven shaft 34' to which the cone pulley 33 is secured. A mileage counter 39 is secured to and driven by the driven shaft 34' and the mileage counter 39 is substituted for the pointer 38 and dial 40 of the above described embodiment. Thus, adjustment of the yoke 37 of the ground speed indicator provides the desired adjustment of the first variable transmission in order that ground mileage is accurately indicated by the ground mileage counter 39.

The second variable transmission in this embodiment, the ratio of which is varied with elapsed time, necessary to compensate for time elapsed in adjusting ground mileage in the counter 39 and automatically adjusting the average ground speed is provided by the cone pulley 41 rotatably disposed on the shaft 74' and the cone pulley 43 oppositely disposed on the shaft 34'. A belt 45 engages the cone pulleys 41 and 43 and the position of the belt on the pulleys is adjusted by the yoke 47 threaded to the threaded driving shaft 49. The driving shaft 49 is driven at a constant speed by the clock motor 12' by means of the driving pulley 51 secured to driving shaft 14a driving the driven pulley 53 secured to the driving shaft 49 and being linked by the endless belt 55. A knurled knob K' is secured at the end of the shaft 74' and a clutch 57 is provided on the knob K' and the pulley 41. The pulley 41 is free to rotate about the shaft 74' and, by inward movement of the knob K' the clutch 57 is engaged and the cone pulley 41 may be rotated with the shaft 74'.

The operation of this embodiment is substantially the same as that described above and, at the point of departure, the clutch 59 on the shafts 14' and 14a is engaged. Previous to this, with knob K' in an inward position and the clutch 57 engaged, the shaft 74' is rotated to bring the ground speed pointer to the estimated ground speed. Thus, the mileage travelled based on estimated ground speed is indicated in mileage indicator 39 by means of the constant driving clock motor 12' through the adjusted variable transmission elements 31, 33 and 35. At a check station, the actual ground mileage is compared to that indicated by the mileage counter 39 and, in the event an adjustment is necessary, the knob K' is moved inwardly to engage the clutch 57 and rotated to provide the correct ground mileage in the mileage counter 39. The ratio of the second variable transmission 41, 43 and 45 is varied with elapsed time at a predetermined rate by providing the proper shape on the pulleys 41 and 43 and by the movement of the nut 47 which adjusts the position of belt 45 on the cone pulleys 41 and 43. Thus, elasped time is compensated for in making the necessary adjustment in the ground mileage indicator 39 and the average ground speed adjustment between the check points is provided by means of the nut 37 moving on the threaded shaft 74' and thereby varying the ratio of the first variable transmission 31, 33 and 35. Interference between the belts 45 and 35 is avoided by providing greater torque transmitting power in belt 45 than in belt 35.

If desired, and as shown, auxiliary aids to navigation may be provided, such as the reset counter 59' connected to the clock motor shaft 14a, to indicate time remaining to destination. A manually set indicator 61 to indicate the estimated time of arrival at destination may be provided. Similarly, indicators 63 and 65 may be secured to the driven shaft 34' to indicate the total mileage remaining to destination and the miles between predeterminde check points, respectively. As illustrated, a lever 67 is provided to clear the ground mileage indicator 65 and reset wheels 69 are provided to make desired individual adjustments in the indicators 23, 39, 59, 61 and 63. The levers and reset wheels and linkages are all conventional and no detailed description thereof is deemed necessary. The lever 67 is preferably linked, not shown, to the ratchet nut 47 so that clearing of the mileage between check points in the indicator 65 automatically moves the nut 47 to initial position.

From the above description of examples of the invention, it is manifest that many changes may be made in the details and arrangement of parts of the present invention. For example, any type of gearing or frictional elements may be utilized in the variable transmissions, including reduction gearing and the like, and, if desired, a constant driving means such as a tachometer drive from the engine or propeller may be substituted for the clock motor. By way of further example any conventional gearing arrangement may be utilized in place of the nuts 37 and 78 and the threaded shafts 74 and 74', such as worm gearing and the like. Also in place of wheels 30 and 62, in order to reduce slipping or skidding, balls rolling between disc 32 and shafts 24 and 66, respectively, may be substituted.

Thus, from the above detailed description of the several examples constructed in accordance with the invention, and given for the purpose of disclosure, it is seen that the invention is of wide scope and use. Considerable rearrangement and changes in the details of construction may be made and additional aids to navigation added or deleted as desired.

Broadly the invention comprises a first variable transmission, the ratio of which is proportional to ground speed and a second variable transmission or synchronizer which is inversely proportional to a predetermined increment of time to provide an automatic adjustment of ground speed upon adjusting a ground mileage indicator driven by the first variable transmission. Accordingly, I desire to be limited only by the spirit of the invention as defined by the scope of the appended claims.

What is claimed is:

1. An aircraft instrument comprising, a first variable transmission, the ratio of which is proportional to ground speed; an indicator of ground mileage driven by said first variable transmission; a second variable transmission, the ratio of which is inversely proportional to a predetermined increment of time; an indicator of ground speed connected to said second variable transmission; a motor driving said first variable transmission and changing the drive ratio of said second variable transmission; a control member, said control member being in and driven by said second variable transmission; a member in said first and second transmissions normally driven by said first variable transmission and normally disengaged from said control member but shiftable to engage said control member whereby adjustment of the ratio of said first variable transmission and adjustment of said indicators is determined by the position of the control member; and means for driving said second variable transmission on engagement of said shiftable member and said control member.

2. The aircraft instrument of claim 1 where the first variable transmission includes a driving shaft and a driven shaft, the indicator of ground mileage being connected to said driven shaft, first friction means rotated by and slideable on said driving shaft, and where said member comprises second friction means on and driving said driven shaft, said second friction means being normally engaged and driven by said first friction means.

3. The aircraft instrument of claim 1 where the first variable transmission includes a driving shaft and a driven shaft, the indicator of ground mileage being connected to said driven shaft and said driving and driven shaft being at right angles to one another, a first friction wheel rotated by and slideable on said driving shaft, and where said member comprises a second friction wheel on and driving said driven shaft, said first and second friction wheels being at right angles to one another and said first friction wheel normally engaging and driving said second friction wheel.

4. The aircraft instrument of claim 3 where the control member determines the adjustment of said first friction wheel.

5. The aircraft instrument of claim 1 where the second variable transmission includes a driving shaft and a cam rotated by and secured to said driving shaft, a follower, a second driving shaft, said control member comprising first friction means secured to said follower and slidable on and driving said second driving shaft, a driven shaft, an element engaging said driven shaft and movable axially thereof by rotation of said driven shaft, a pivoted link secured to said indicator of ground speed and engaged and pivoted by said element, meshing gears on said second driving and said driven shaft, and second friction means driven by the first variable transmission, said second friction means being secured to said pivoted link whereby its position is determined by adjustment of the pivoted link, said second friction means normally engaging and driving said member, shifting of said member disengaging said second friction means and engaging said first friction means whereby manual movement of said member drives said second driving shaft thereby driving said driven shaft and adjusting the position of said second friction means.

6. The aircraft instrument of claim 1 where the second variable transmission includes a driving shaft and a cam rotated by and secured to said driving shaft, a follower, a second driving shaft, said control member comprising a first friction wheel secured to said follower and slidable on and driving said second driving shaft, a threaded driven shaft, an element threaded on said threaded driven shaft and movable axially thereof by rotation of said threaded driven shaft, a pivoted link secured to said indicator of ground speed and engaged and pivoted by said element, meshing gears on said second driving and driven shafts, and a second friction wheel driven by the first variable transmission, said second friction wheel being secured to said pivoted link whereby its position is determined by adjustment of the pivoted link, said second friction wheel normally engaging and driving said member, shifting of said member disengaging said second friction wheel and engaging said first friction wheel whereby manual movement of said member drives said second driving shaft thereby driving said driven shaft and adjusting the position of said second friction wheel.

7. The aircraft instrument of claim 1 where said first variable transmission includes driving and driven shafts, cone pulleys oppositely disposed on said shafts, an endless belt engaging said pulleys and said indicator of ground speed, the position of said belt on said pulleys being determined by the position of said indicator of ground speed.

8. The aircraft instrument of claim 1 where the second variable transmission includes a driving shaft, the control member comprising an element engaging said driving shaft and movable axially of said shaft by rotation thereof, a pair of oppositely disposed cone pulleys, an endless belt engaging said pulleys and said element, the position of said belt on said pulleys being determined by the position of said element, and said member is shiftable to engage and to rotate one of said pulleys when adjusting said indicators.

9. An aircraft instrument comprising a first variable transmission, the ratio of which is proportional to ground speed and including first driving and first driven shafts, cone pulleys oppositely disposed on said shafts, an indicator of ground speed, an endless belt engaging said pulleys and said indicator of ground speed, an indicator of ground mileage connected to and driven by said first driven shaft; a second variable transmission including a first threaded driving shaft, an element threaded on said first threaded driving shaft and movable axially of said first threaded driving shaft by rotation thereof, a second threaded shaft to which said ground speed indicator is threadedly secured and movable axially by rotation of such second threaded shaft, oppositely disposed second cone pulleys on said first driven shaft and rotatable on said second threaded driven shaft, an endless belt engaging said second cone pulleys and said element, the position of said belt on said second cone pulleys being determined by the position of said element on said first threaded shaft, and clutch elements secured to said second threaded shaft and said second pulley thereon, said clutch elements being normally disengaged but shiftable to engage one another whereby upon engagement of such clutch elements and rotation of said second pulley on said second threaded shaft rotates the second pulley on said first driven shaft thereby determining adjustment of said ground mileage indicator and rotation of said second threaded shaft determines adjustment of said ground mileage indicator.

10. An aircraft instrument comprising a first variable transmission, the ratio of which is proportional to ground speed and including a first driving shaft and a first driven shaft, said first driving and first driven shafts being at right angles to one another, a first friction wheel rotated by and slidable on said first driving shaft, a second shiftable friction wheel on and driving said first driven shaft, said first and second friction wheels being at right angles and normally frictionally engaging one another; a ground mileage indicator actuated by said first driven shaft; a second variable transmission, the ratio of which is inversely proportional to elapsed increments of time and including a second driving shaft and a cam rotated by and secured to said second driving shaft, a follower, a third driving shaft, a third friction wheel secured to said follower and slidable on and driving said third driving shaft, a threaded third driven shaft, an element threaded on said third threaded driven shaft and movable axially thereof by rotation of said third threaded driven shaft, a yoke securing said element and said first friction wheel whereby movement of said element determines the position of said first friction wheel, meshing gears on said third driving and third threaded driven shafts; and an indicator of ground speed secured to and actuated by said yoke; shifting of said second friction wheel disengaging said first friction wheel and engaging said third friction wheel thereby forming a link in said second transmission, and manual means for driving said second variable transmission and shifting said second friction wheel whereby manipulation of said manual means shifts said second friction wheel out of engagement with said first friction wheel and into engagement with said third friction wheel thereby driving said third driving shaft and said threaded third driven shaft and adjusting the position of said first friction wheel thereby determining adjustment of said first variable transmission.

11. An aircraft instrument comprising, a first variable transmission, the ratio of which is proportional to ground speed; and a second variable transmission, the ratio of which is inversely proportional to time elapsed; a constant power source driving said first variable transmission and changing the drive ratio of said second variable transmission; said second variable transmission including and driving a control member; said first and second variable transmissions including a member normally disengaged from said control member but shiftable to engage said control member whereby on engagement of the member and the control member adjustment of said first variable transmission is determined by the position of said control member; and means for driving said second variable control transmission is determined by the position of said able transmission on engagement of said member and said control member.

12. An aircraft instrument comprising, a variable transmission, the ratio of which is proportional to ground speed; an indicator of ground mileage driven by said variable transmission; a synchronizer; a constant power source driving said variable transmission and adjusting the drive ratio of a portion of the synchronizer; and an indicator of ground speed connected to said synchronizer; said synchronizer including and driving a control member; said variable transmission and said synchronizer including a member normally disengaged from said control member but shiftable to engage said control member whereby on engagement of the member and the control member adjustment of said first variable transmission is determined by the position of said control member; and means for driving said synchronizer on engagement of said member and said control member.

13. An aircraft instrument comprising, a first variable transmission, the ratio of which is proportional to ground speed; an indicator of ground mileage driven by said first variable transmission; a second variable transmission, the ratio of which is inversely proportional to time elapse; a constant power source driving said first variable transmission and changing the drive ratio of said second variable transmission; manual means for driving said second variable transmission; and an indicator of ground speed connected to said second variable transmission; said second variable transmission including and driving a control member, the position of the control member determining adjustment of the first variable transmission; said first and second variable transmissions including a member normally disengaged from said control member but shiftable to engage said control member whereby on engagement of the member and the control member driving of said second variable transmission adjusts the first variable transmission.

14. An aircraft instrument comprising, a first variable transmission, the ratio of which is proportional to ground speed; a second variable transmission, the ratio of which is inversely proportional to a predetermined increment of time; constant power means driving said first variable transmission and changing the drive ratio of said second variable transmission; manual means for driving said second variable transmission; and a control member included in and driven by said second variable transmission, the position of the control member determining the adjustment of the first variable transmission, said first and second variable transmissions including a member normally disengaged from said control member but shiftable to engage said control member whereby on engagement of the member and the control member driving of said second variable transmission adjusts said first variable transmission.

15. An aircraft instrument comprising, a variable transmission, the ratio of which is proportional to ground speed; an indicator of ground mileage driven by said variable transmission; a synchronizer, the ratio of which is inversely proportional to a predetermined increment of time; an indicator of ground speed connected to said synchronizer; a constant power source driving said first variable transmission and changing the drive ratio of a portion of said synchronizer; a control member included in and driven by said synchronizer, the position of said control member controlled by said portion of said synchronizer, said control member controlling adjustment of said first variable transmission; said first variable transmission and said synchronizer including a member normally disengaged from said control member but shiftable to engage said control member; and means for driving the synchronizer whereby on engagement of the member and the control member driving of said synchronizer adjusts said first variable transmission and said indicators.

16. An aircraft instrument comprising, a first variable transmission, the ratio of which is proportional to ground speed; a second variable transmission, the ratio of which is inversely proportional to an increment of elapsed time; a motor driving said first variable transmission and changing the drive ratio of said second variable transmission; a control member, said control member included in and driven by said second variable transmission, said control member determining adjustment of said first variable transmission; said first and second variable transmissions including a member normally disengaged from said control member but shiftable to engage said control member; and manual means for shifting said member and driving said second variable transmission whereby manipulation of said manual means shifts said member into engagement with said control member and drives said second variable transmission thereby adjusting said first variable transmission.

References Cited in the file of this patent

UNITED STATES PATENTS

| Re. 19,009 | McGanghy | Nov. 28, 1933 |
| 1,985,265 | Smith | Dec. 25, 1934 |
| 2,159,882 | Borden | May 23, 1939 |
| 2,206,252 | Gould | July 2, 1940 |
| 2,206,875 | Chafee et al. | July 9, 1940 |

FOREIGN PATENTS

| 355,775 | Germany | July 7, 1922 |